United States Patent
Idani et al.

(10) Patent No.: US 6,901,274 B2
(45) Date of Patent: May 31, 2005

(54) PORTABLE INFORMATION DEVICE

(75) Inventors: Shigehiro Idani, Kawasaki (JP); Hiroshi Yamada, Kawasaki (JP); Yasushi Hara, Kawasaki (JP); Hideki Tanaka, Kawasaki (JP); Satoshi Kazama, Kawasaki (JP); Toshiya Miyazaki, Kawasaki (JP); Hideyuki Motoyama, Kawasaki (JP); Yoshiyasu Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 406 days.

(21) Appl. No.: 10/285,478

(22) Filed: Nov. 1, 2002

(65) Prior Publication Data

US 2004/0204132 A1 Oct. 14, 2004

(30) Foreign Application Priority Data

Apr. 30, 2002 (JP) ...................................... 2002-128014

(51) Int. Cl.[7] ................................................ H04B 1/38
(52) U.S. Cl. ................ 455/566; 455/550.1; 455/575.1; 455/575.6; 455/90; 345/659; 345/169; 345/655
(58) Field of Search .............................. 455/566, 550.1, 455/575.1, 575.6, 90, 575.3, 575.8; 345/659, 169, 655; 379/433.04, 433.06

(56) References Cited

U.S. PATENT DOCUMENTS

| | | | | |
|---|---|---|---|---|
| 6,198,948 B1 * | 3/2001 | Sudo et al. | ................ | 455/566 |
| 6,441,828 B1 * | 8/2002 | Oba et al. | .................... | 345/659 |
| 6,466,202 B1 * | 10/2002 | Suso et al. | ................... | 345/169 |
| 6,771,992 B1 * | 8/2004 | Tomura et al. | .......... | 455/575.1 |
| 6,775,560 B2 * | 8/2004 | King et al. | ................. | 455/566 |
| 6,839,576 B2 * | 1/2005 | Aagaard et al. | ......... | 455/575.1 |
| 2002/0082042 A1 * | 6/2002 | Mark et al. | ................. | 455/550 |

FOREIGN PATENT DOCUMENTS

| | | | |
|---|---|---|---|
| JP | 06-208433 | 7/1994 | ............ G06F/3/03 |
| JP | 9-321848 | 12/1997 | |
| JP | 2000-201208 | 7/2000 | |
| JP | 2000-311174 | 11/2000 | ........... G06F/17/30 |
| JP | 2001-309027 | 11/2001 | |

* cited by examiner

Primary Examiner—Sonny Trinh
Assistant Examiner—Phuoc Doan
(74) Attorney, Agent, or Firm—Staas & Halsey LLP

(57) ABSTRACT

The device includes a device body that includes a display means that allows selection from among a plurality of display directions for display of images, information and the like; an operational instruction means capable of accepting input of instructions including selection instructions for selecting display direction of images, information and the like on the display means; and a battery unit that supplies power to the device body. The device body is provided with a plurality of attachment positions, such that at least one of the operational instruction means and the battery unit can be attached in a position that is compatible with the display direction of images, information and the like on the display means.

8 Claims, 9 Drawing Sheets

PORTABLE INFORMATION DEVICE

BACKGROUND OF THE INVENTION

1. Field of the Invention

The present invention relates to a portable information device; more specifically, it relates to a portable information device that allows a user to browse the Internet using a communication device and input information using a touch panel.

2. Description of the Related Art

In recent years, devices have become increasingly miniaturized and energy efficient, and because the telecommunications infrastructure has been built out, portable information devices that allow a user to access the Internet virtually anytime and anywhere have become common. Given this, it is expected that display devices known as tablet devices will become increasingly popular, because of their operability and portability.

With advances in wireless technology and energy efficiency technology, it is increasing common to see users, freed from network cables and power supply cables, using tablet devices. For this reason, tablet devices need to have an optimal interface to allow use in a variety of situations.

Furthermore, there is great variety in Internet content, including news articles that are primarily text, and moving images, such as video images. For the former, it is most natural and efficient for a user to view this on a screen that is longer vertically than horizontally, in the same manner that one reads the newspaper; for the latter, it is more natural to view this on a screen that is longer horizontally than vertically, as with television and movie screens. Therefore, it would be more convenient for a user to be able to choose the use mode depending on content, so that the tablet device screen could be used either vertically or horizontally.

Meanwhile, in supporting a tablet device, there are two conceivable cases: depending on whether a user is right- or left-handed and on use conditions, cases where a user will hold the device with the right hand, and cases where a user will hold the device with the left hand. Thus for these tablet devices, universal design considerations and increasing user convenience to allow for different ways of holding the device are important matters.

The display device disclosed in Japanese Laid-open Patent Application 2000-311174 is an example of the conventional technology for accommodating universal design. This display device is constituted so that the operational buttons can be for both left hand and right hand use, through the switching of display direction by means of an inclination sensor that senses inclination and at the same time switching the operational buttons to settings for either left hand use or right hand use, depending on the inclination direction.

However, this method has the problem of faulty operation when the user is lying down, as well as the problem of limitations on the situations in which a device can be used effectively.

The terminal device disclosed in Japanese Laid-open Patent Application 6-208433 offers means for appropriate viewing of a variety of content. In this invention, buttons are disposed around the periphery of the display, and depending on the positions on a touch panel that a user touches and the position in which buttons are touched, the functions of those buttons change. However, with this method, not only does cost increase because of the increased number of buttons, but it can be expected that a user will get confused as to which buttons to use.

Furthermore, for these kinds of tablet devices, the lighter they are, the more convenient they are; with the current technology, however, because of the weight of the battery unit and other factors, there are no devices sufficiently user friendly that they can be easily used with one hand, and thus these devices have not yet come into common use.

SUMMARY OF THE INVENTION

It is an object of the present invention to provide a so-called "tablet device" type of portable information device with the flexibility to be adapted to address issues of universal design and to be held in diverse ways, so that a user can easily use it with one hand.

A portable information device comprises a device body comprising a display means such that selection can be made from a plurality of display directions for display of images and information and the like, an operational instruction means capable of accepting input of instructions including selection instructions to the display means to select display direction for images, information and the like, and a battery unit that supplies power to the body. The portable information device having a plurality of attachment positions on the device body so that at least one of the operational instruction means and the battery unit can be attached at a position compatible with display direction of images, information and the like on the display means.

Here, the operational instruction means comprises a plurality of instruction units, the functions of the operations units differing in accordance with position of attachment on the device body.

Likewise, the device body decides display direction of images, information and the like on the display means in accordance with the position of attachment of the operational instruction means on the device body.

Further, the device body comprises an attachment position such that the operational instruction means and the battery unit can be integrally attached.

Likewise, the plurality of attachment positions of the device body are such that at least one of the operational instruction means and the battery unit can be attached within a prescribed range.

Further, the plurality of attachment positions of the device body are disposed such that the operational instruction means and the battery unit are positioned in the same direction with regard to the display means.

The display means has a rectangular shape having long sides and short sides, and the plurality of attachment positions on the device body are disposed in positions such that at least one of the operational instruction means and the battery unit can be attached to allow the accommodation of the display direction of images, information and the like for which the long sides of the display means are positioned vertically and of the display direction of images, information and the like for which the short sides of the display means are positioned vertically.

Likewise, a portable information device of the present invention comprises a device body comprising a display means for displaying information, a battery unit, disposed in a direction offset from the center of the display means, that supplies power to the device body, a grip for supporting the device body in the center of gravity direction in which the battery unit is disposed, and an operational instruction means disposed on the grip and capable of accepting input of instructions for the display means.

Because a user holds this portable information device by a grip, he/she can support the device body with one hand and can operate it using the same hand that holds the device; in addition, because a user will support the device at its center of gravity, it becomes easy to operate while holding. In other words, because an operational instruction unit is provided at the center of gravity, the device is naturally supported at its center of gravity, and the portable information device can be supported in a natural and comfortable manner.

From the following detailed description in conjunction with the accompanying drawings, the foregoing and other objects, features, aspects and advantages of the present invention will become readily apparent to those skilled in the art.

A BRIEF DESCRIPTION OF THE DRAWINGS

DESCRIPTION OF THE PREFERRED EMBODIMENTS

Overall Constitution

An embodiment of a portable information device according to the present invention will be explained with reference made to the drawings.

Figure 1:
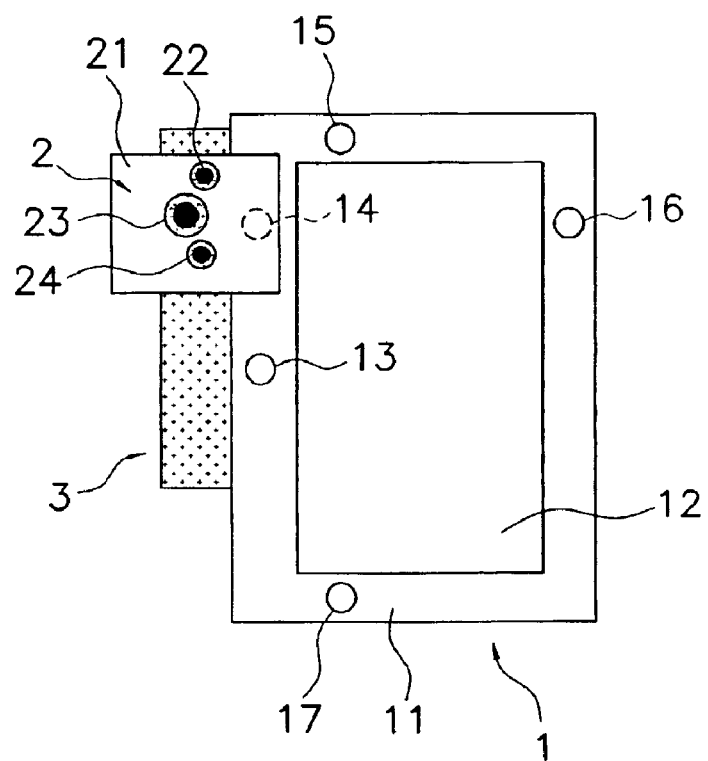
FIG. 1 is a front view of a portable information device according to a first embodiment of the present invention.

As shown in FIG. 1, this portable information device has a device body 1, an operations unit 2 and a battery unit 3, both removably attached to the device body 1.

The device body 1 has a frame 11 containing a control unit therewithin and a display panel 12 disposed in the opening of the frame 11.

Disposed on the front surface of the frame 11 are a power switch 13 and a plurality of connection units 14, 15, 16, 17 for making an electrical connection in accordance with the position of attachment of the operations unit 2. The connection units for connection with the operations unit 2 may be given a constitution that matches the constitution of the connection unit on the operations unit 2; a constitution is also possible such that connection units are also provided on the back surface of the frame 11 in correspondence with the connection units 14 to 17, or a constitution such that connection units are provided only on the front surface, or a constitution such that connection units are provided only on the rear surface. It is also possible to dispose two or more connection units on each side of the frame 11, in accordance with the attachment positions of the operations unit 2.

The display panel 12 may be a liquid crystal display, a plasma display panel, an organic electroluminescence display or the like. In this embodiment, a panel having a rectangular shape, with long sides and short sides, is used, and it is constituted so that selection can be made at least between a display mode (vertical) where the long sides are positioned vertically and a display mode (horizontal) where the short sides are positioned vertically.

The operations unit 2 includes an operations unit main body 21, and switches 22 to 24 disposed on the surface of the operations unit main body 21. These switches 22 to 24 are for accepting input of instructions such as commands for viewing different pages of an image displayed on the display panel 12 and activating a software keyboard for inputting URLs; such switches may be, for example, vertical and horizontal scroll keys, a cross-shaped key for instructions to shift focus, a decision key for deciding buttons on the screen, a cancel key for canceling processes, a power key for operating the power supply of the device body 1, a screen rotation key for commands to rotate screen, and the like.

Figure 2:
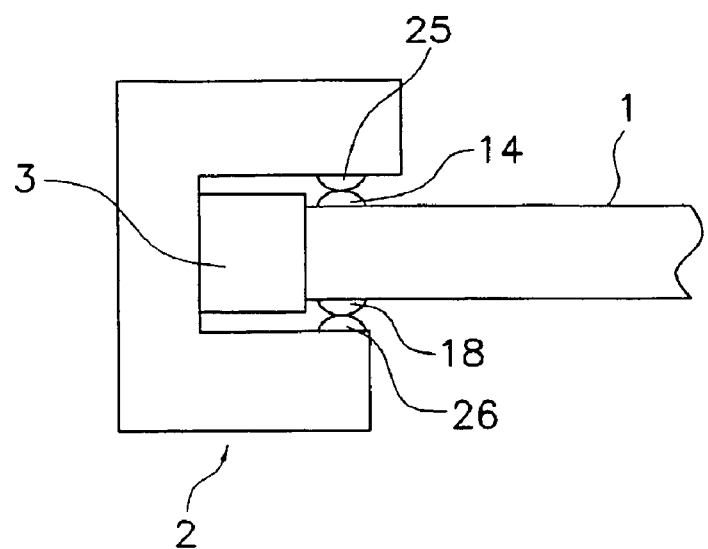
FIG. 2 is a plan view of the same.

As shown in FIG. 2, the operations unit 2 is formed roughly in the shape of the letter C so as to grasp and hold the frame 11 of the device body 1 from the front and rear; it includes a connection unit 25 to enable it to make electrical connections with any of connection units 14 to 17 of the frame 11. A connection unit 26 may be further provided on the portion that comes in contact with the rear side of the frame 11, to connect with a connection unit 18 provided on the frame 11.

Figure 3:
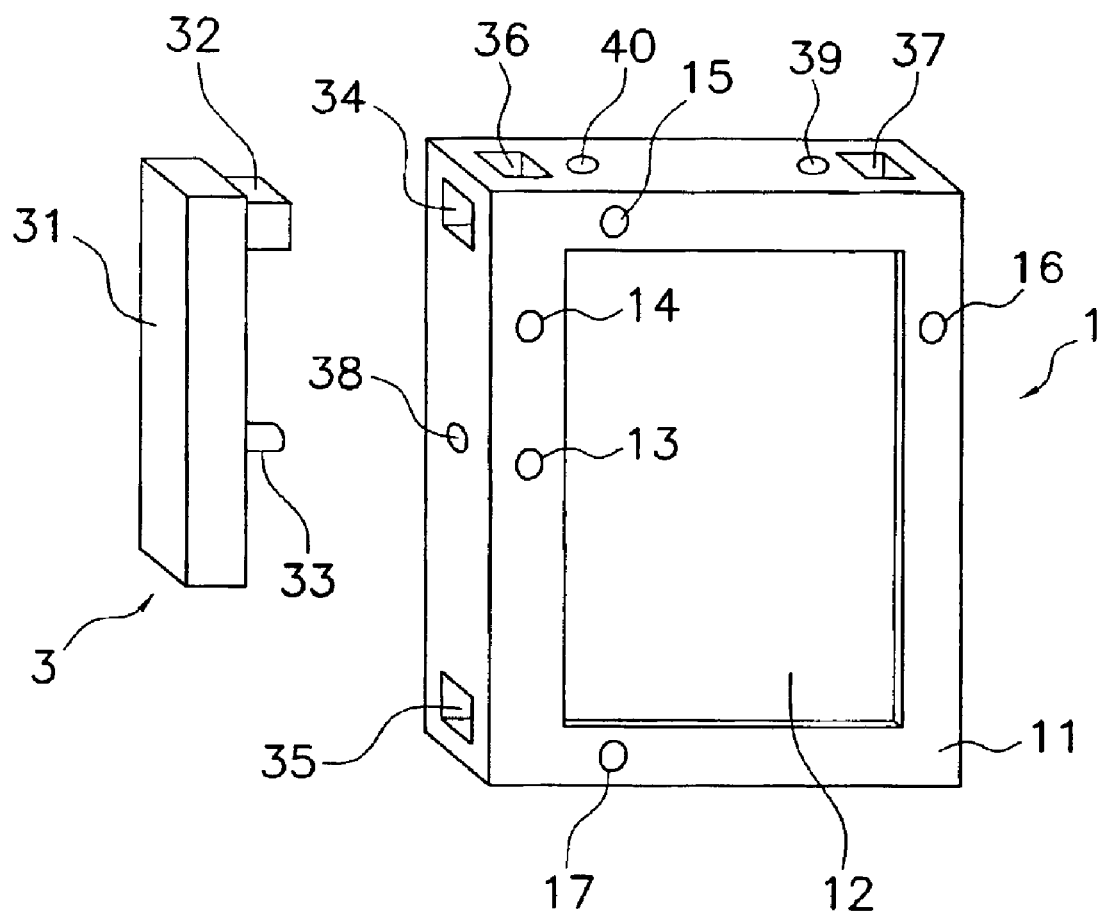
FIG. 3 is a drawing for explaining battery attachment.

As shown in FIG. 3, the battery unit 3 includes a battery 31, an electrical connector 32 on a side surface of the battery 31, and a securing hinge 33.

The device body 1 is provided with connector engagement units 34 to 37 on the sides of the frame 11 for engaging the electrical connector 32 of the battery unit 3. As shown in FIG. 3, connector engagement units 34 and 35 are disposed on the left side surface of the frame 11, and connector engagement units 36 and 37 are disposed on the upper side surface of the frame 11; while not shown in the drawing, a plurality of connector engagement units are also disposed on the right side surface and bottom side surface.

Also provided on the left side surface of the frame 11 is a hinge engagement unit 38, which is positioned to allow it to engage with the securing hinge 33 when the electrical connector 32 of the battery unit 3 is connected with the connector engagement unit 34 of the device body 1. This hinge engagement unit 38 is also used when the electrical connector 32 of the battery unit 3 is connected with the connector engagement unit 35. The positional relationship of the electrical connector 32 and the securing hinge 33 of the battery unit 3 may also be such that separate hinge engagement units are provided for both the connector engagement units 34 and 35. On the upper side surface of the frame 11 a hinge engagement unit 39 is provided in a position that allows it to engage with the securing hinge 33 when the electrical connector 32 of the battery unit 3 is connected with the connector engagement unit 36, and a hinge engagement unit 40 is provided in a position that allows it to engage with the securing hinge 33 when the electrical connector 32 of the battery unit 3 is connected with the connector engagement unit 37. The positional relationship between the electrical connector 32 and the securing hinge 33 of the battery unit 3 can also be set so that a single hinge engagement unit can be used for both the hinge engagement units 39 and 49. Further, a lock mechanism may be provided on the device body 1 to ensure that the battery unit 3 is properly secured to the device body 1.

Figure 4:
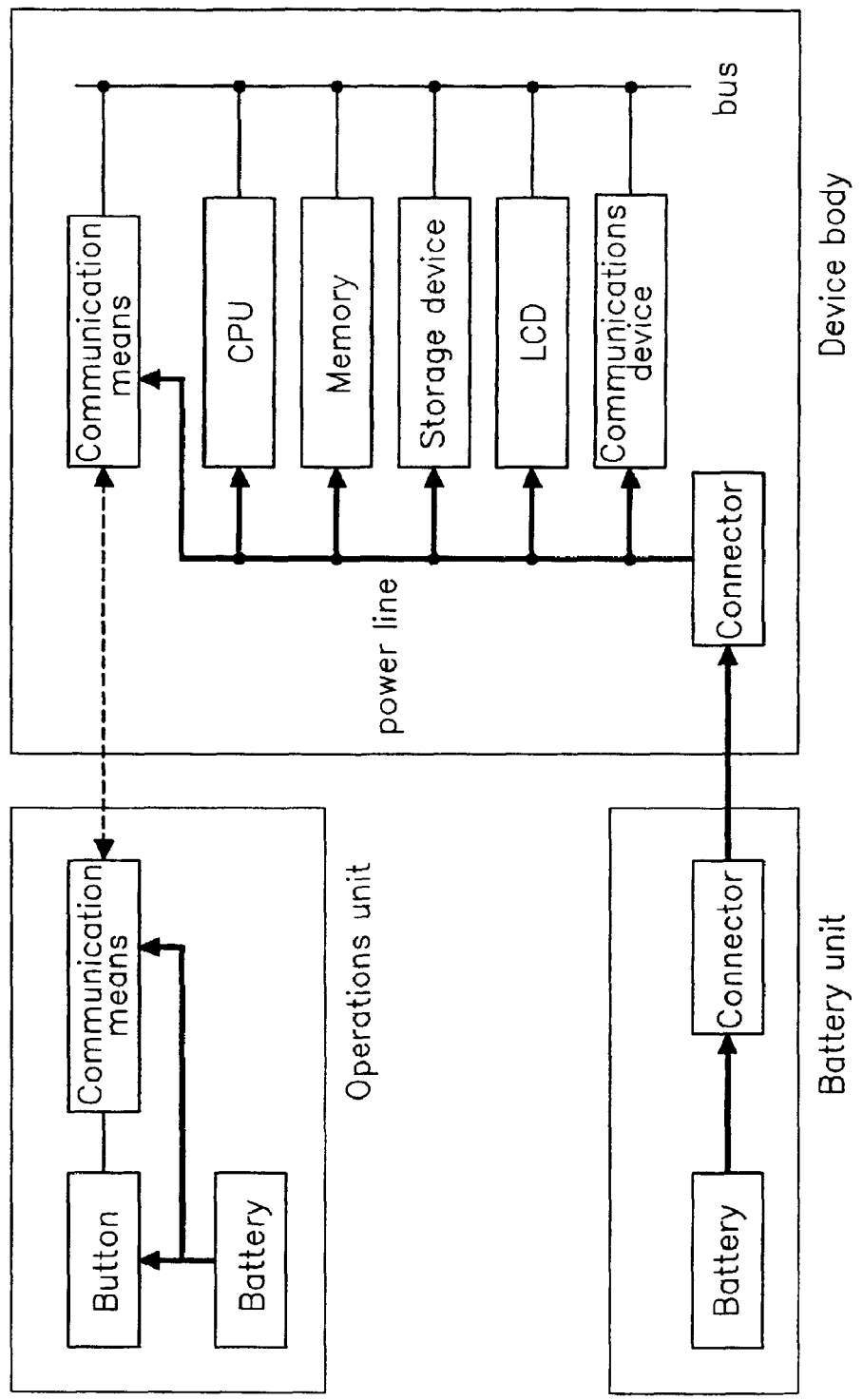
FIG. 4 is a control block diagram.

FIG. 4 shows a control block diagram of this portable information device.

The device body 1 includes a CPU 101, a memory 102 that temporarily stores the various parameters necessary for processing, a storage device 103 for storing data, a display device 104 constituting the display panel 12, a communications device 105 for downloading content from an external source, and a communication means 106 for communicating with the operations unit 2. The communications device 105 may comprise an interface for a LAN, modem, wireless LAN (802.11b), Bluetooth, PHS, portable phone or the like. The communication means 106 is for transmission and reception of data to and from the operations unit 2; a constitution may be used that in place of the transmission and reception of data using an electrical connection as shown in FIGS. 1 to 3, provides a wireless communication device, such as for infrared communication (IrDA), Bluetooth, wireless LAN or the like. The CPU 101, the memory 102, the storage device 103, the display device 104, the communication device 105 and the communications means 106 are connected by a bus, and transmission and reception of data therebetween and control of each unit are performed thereby.

In addition, a power source connector 107 comprising connector engagement units 34 to 37 is contained within the device body 1; power supplied from the battery unit 3 via this power source connector 107 is supplied to each unit by a power line.

The operations unit 2 includes a button group 201 comprising switches 22 to 24 (see FIG. 1), a communication means 202 that carries out transmission and reception of data to and from the communication means 106 of the device body 1, and a battery 203 that supplies power to the button group 201 and the communication means 202. A constitution whereby the battery 203 is omitted and power is supplied from the battery unit 3 to the button group 201 and the communication means 202 is possible, as is a constitution whereby power is supplied from the battery unit 3 via the device body 1, and a constitution whereby electric waves sent from the device body 1 causes electromagnetic induction and commands from the button group 201 are sent to the device body 1. The battery 203 in the operations unit 2 may be constituted so that when it is attached to the device body 1, it is recharged via connection units using power supplied from the battery unit 3 to the device body 1.

The battery unit 3 is constituted by a connector 302 comprising the electrical connector 32 (see FIG. 3) and a battery 301.

Attachment Positions for Operations Unit and Battery Unit

Figure 5:
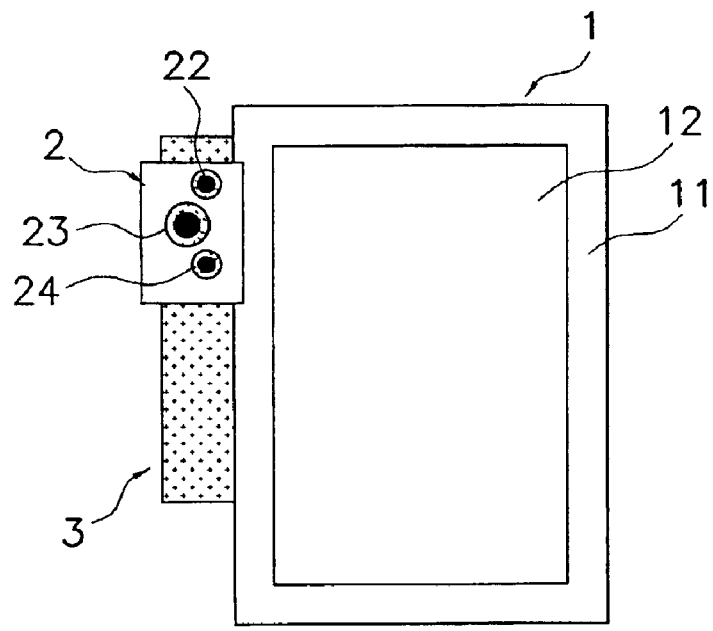
FIG. 5 is a drawing for explaining attachment state.

When the display panel 12, which is rectangular, is to be used vertically and the operations unit 2 is to be operated by the left hand, as shown in FIG. 5, the operations unit 2 is attached to the long side on the left side as seen when facing the frame 11. To allow support of the device body 1 in one hand, it is preferable also to attach the battery unit 3 to the long side on the left side as seen when facing the frame 11, so that the center of gravity of the entire device is close to the operating hand.

Figure 6:
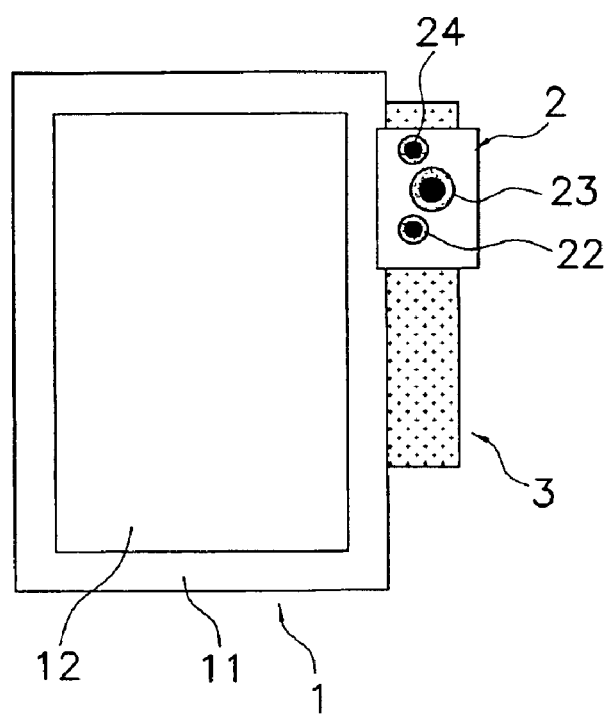
FIG. 6 is a drawing for explaining attachment state.

When the display panel 12 is to be used vertically and the operations unit 2 is to be operated by the right hand, as shown in FIG. 6, the operations unit 2 is attached to the long side on the right side as seen when facing the frame 11. In this case too attaching the battery unit 3 to the long side on the right side as seen when facing the frame 11 simplifies one-handed operation.

Figure 7:
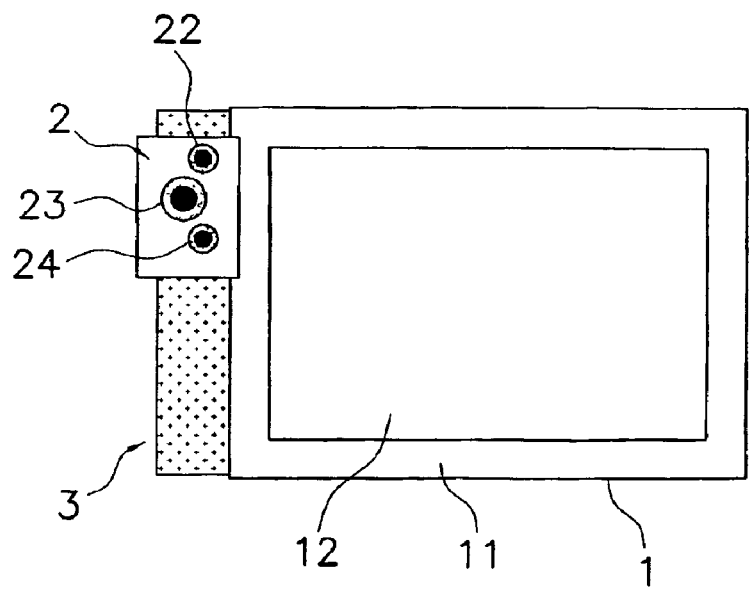
FIG. 7 is a drawing for explaining attachment state.

When the display panel 12 is to be used horizontally and the operations unit 2 is to be operated by the left hand, as seen in FIG. 7, the operations unit 2 is attached to the short side on the left side as seen when facing the frame 11. In this case too attaching the battery unit 3 to the short side on the left side as seen when facing the frame 11 simplifies one-handed operation.

Figure 8:
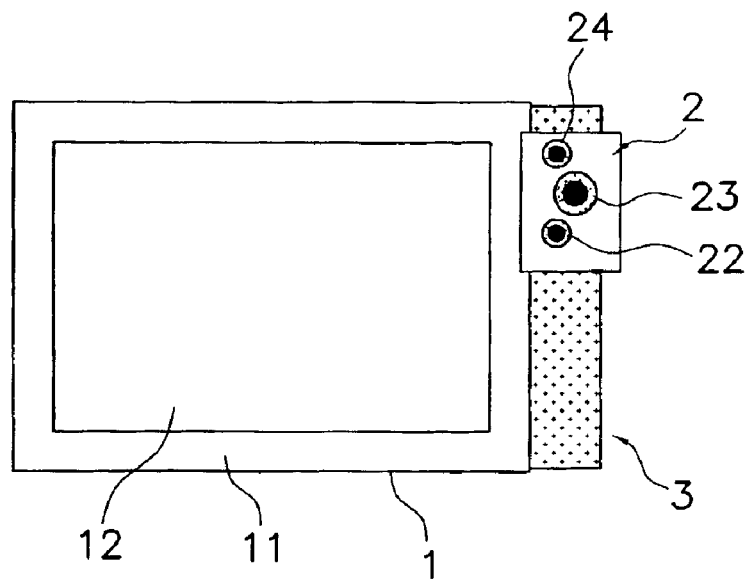
FIG. 8 is a drawing for explaining attachment state.

When the display panel 12 is to be used horizontally and the operations unit 2 is to be operated by the right hand, as seen in FIG. 8, the operations unit 2 is attached to the short side on the right side as seen when facing the frame 11. In this case too attaching the battery unit 3 to the short side on the right side as seen when facing the frame 11 simplifies one-handed operation.

When shifting from a vertical display format as shown in FIGS. 5 and 6 to a horizontal display format as shown in FIGS. 7 and 8, the image displayed on the display panel 12 is rotated either by operating the appropriate switch from among the switches 22 to 24 of the operations unit 2 or by screen rotation from a menu screen displayed on the display panel 12. In such cases, the device body 1 performs a size change of what is being displayed on the display panel 12, so that what is being displayed on the display panel 12 matches the changed screen size.

The device may be constituted so that the position at which the operations unit 2 is attached is detected, and the image displayed on the display panel 12 is automatically rotated depending on this attachment position.

Operations of the Portable Information Device

Figure 9:
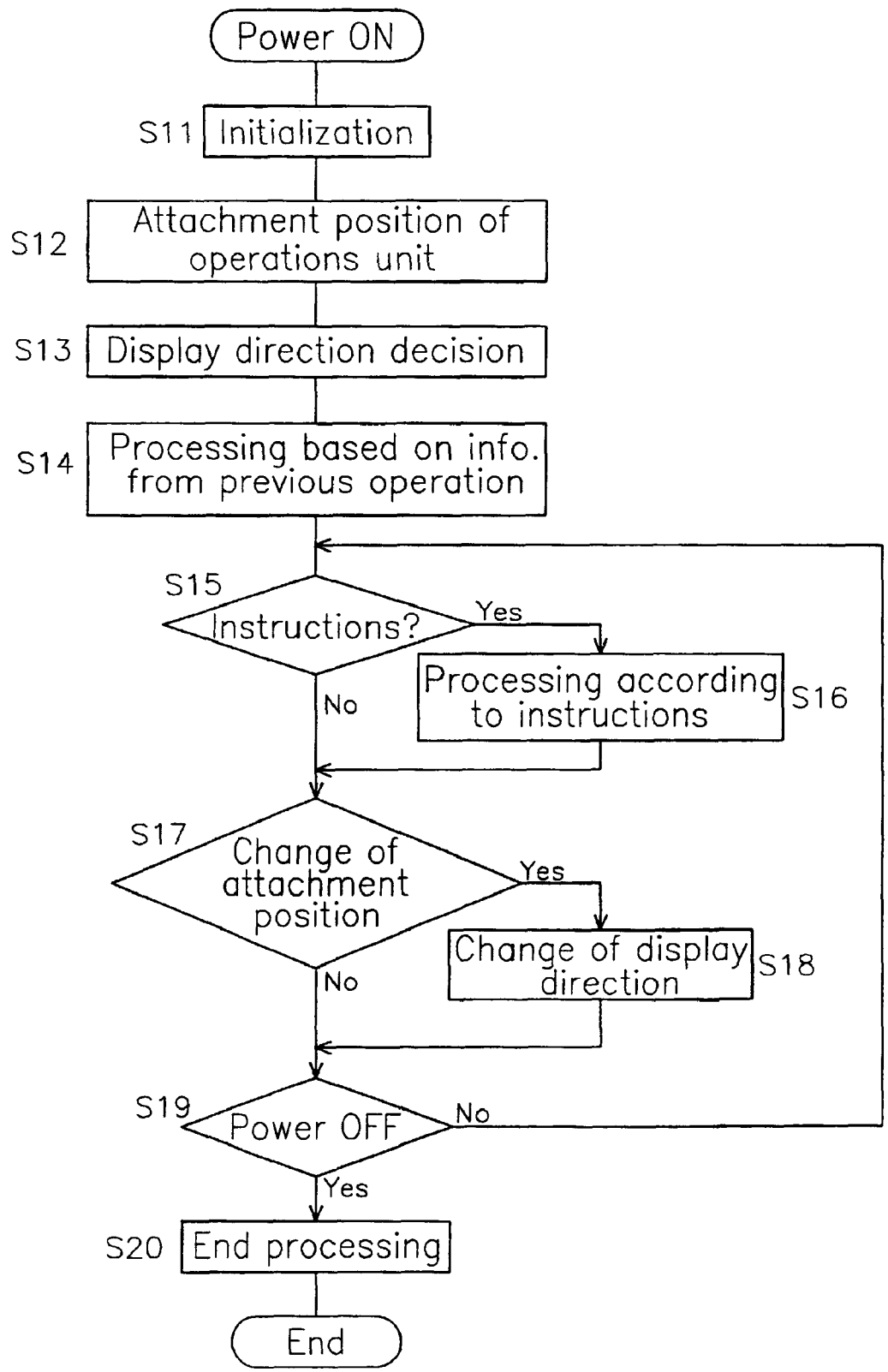
FIG. 9 is a control flow chart.

The operations of a portable information device according to the present invention will be explained with reference to the flowchart shown in FIG. 9.

When the power is turned on, initialization is performed (step S11). If there is previous operations information stored in the storage device 103, information of use format—i.e., whether the device was used vertically or horizontally—and URL information for display is read; if there is no such previous operations information, default information is read and the hardware is initialized.

The attachment position of the operations unit 2 is then detected (step S12). In cases where it is possible to detect attachment position by means of electrical signals from the connection unit at which the operations unit 2 is attached, these signals are used to detect the position at which the operations unit 2 is attached. Depending upon the attachment position of the operations unit 2, the display direction of the image to be displayed on the display panel 12 is decided (step S13). However, a constitution is preferable whereby the decision on display direction based on such attachment position of the operations unit 2 can be bypassed using software settings.

Based on the previous operations information, processing of display on the display panel 12 is executed (step S14). Specifically, in accordance with the URL information in the operations information or with the default URL information, the contents of the relevant URL are displayed on the display panel 12.

Next, it is determined whether or not instructions from the operations unit 2 have been received (step S15). In cases where the operations unit 2 and the device body 1 communicate using wireless communication devices as communication means 106 and 202, the device body 1 is always in a standby mode for receiving data from the operations unit 2; when the operations unit 2 is operated, instruction signals based on such operations are received. In cases where the operations unit 2 and the device body 1 are connected by electrical connection units, the operations unit 2 is initialized at the point in time of connection to the device body 1, allowing the reception of instruction signals from the operations unit 2. In this state, when instruction signals are received from the operations unit 2, control proceeds to step S16.

Based on instruction signals sent from the operations unit 2, the appropriate processing is performed, such as scrolling or opening a link on the current display screen (step S16).

Next, it is determined whether or not the attachment position of the operations unit 2 has changed (step S17). If it is determined that the attachment position of the operations unit 2 has changed, control proceeds to step S18. In step S18, the screen of the display panel 12 is rotated in accordance with the changed attachment position of the operations unit 2 and the display direction of the image being displayed is changed.

Next, it is determined whether instructions have been given to turn off the power (step S19). In cases where it is determined that the power switch 13 (see FIG. 1) has been operated and instructions given to turn power off, control proceeds to step S20. In step S20, operations information at the time of power off—e.g., information of use format (vertical or horizontal use) or URL information of what was being displayed—is stored in the storage device 103, and end processing is executed.

In this embodiment, regardless of whether power of the device body 1 is on or off, the operations unit 2 may be attached or removed; as a rule, however, the attachment and removal of the battery unit 3 is done after the power of the device body 1 is turned off. In such cases, instructions to turn the device body 1 off can by made by means of the power switch 13 provided on the device body 1 or by a power switch provided on the operations unit 2. In such cases, because the operations information at the time the power was turned off is stored in the storage device 103, when the power is turned on again, the state immediately prior to the turning off of power is recreated.

Other Embodiments

Figure 10:
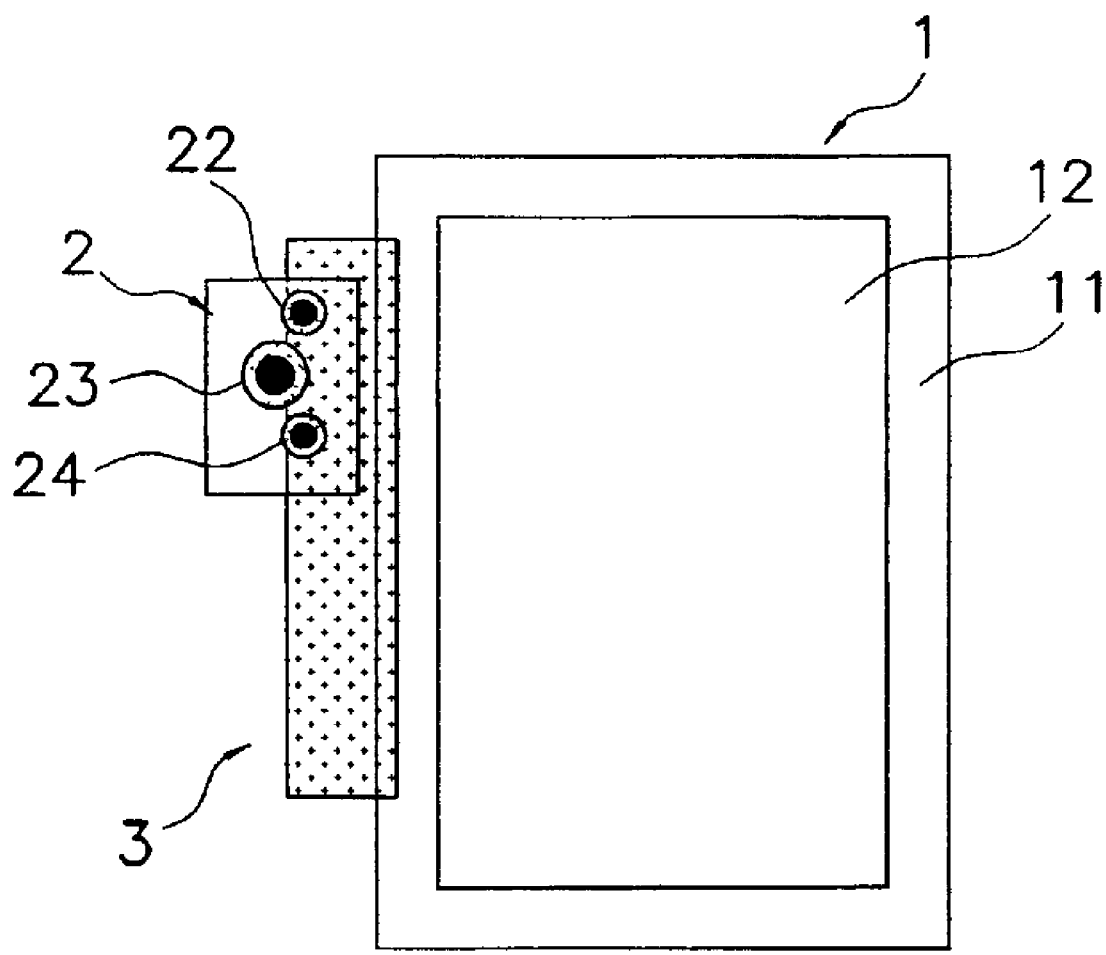
FIG. 10 is a front view of another embodiment of the present invention.

A: As shown in FIG. 10, the operations unit 2 can be constituted so as to be integrally formed with the battery unit 3. For example, a connection unit making possible an electrical connection between the battery unit 3 and the operations unit 2 may be provided; further, connection units can be provided on the battery unit 3 and the device body 1 to transmit instruction signals from the operations unit 2.

With such a constitution, connectors and connection units can be kept in the place where the battery unit 3 and the device body 1 are joined to each other, allowing for simplification of the design of the device body 1.

Figure 11:
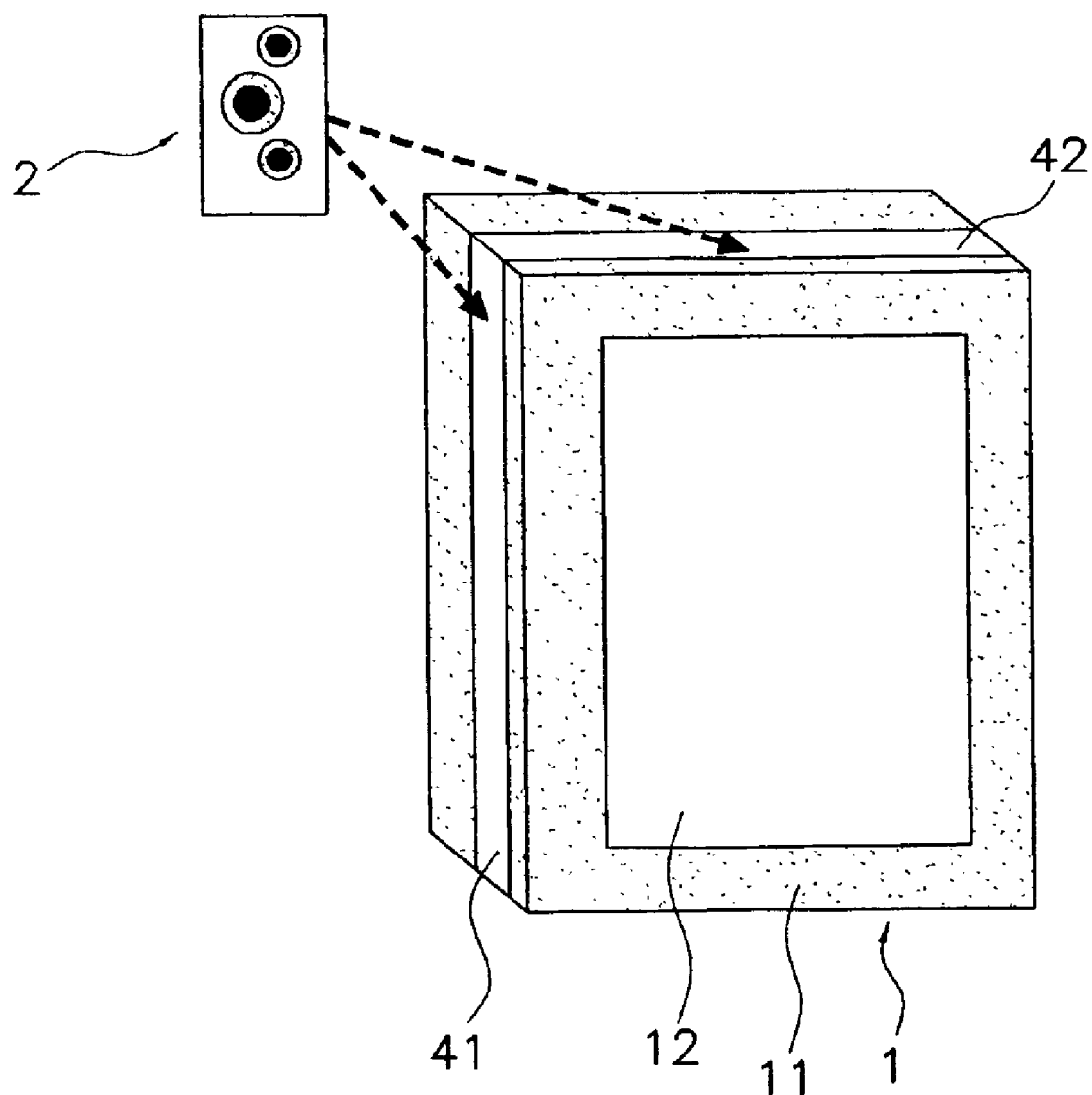
FIG. 11 is a drawing for explaining another embodiment of the present invention.

B: The connection unit for making an electrical connection with the operations unit 2 can be provided within a prescribed range of the frame 11. For example, as shown in FIG. 11, a connection unit 41 having a prescribed range in the vertical direction is provided on the left side surface of the frame 11, as seen facing the frame 11, and a connection unit 42 having a prescribed range in the horizontal direction is provided on the upper side surface.

The operations unit 2 can be attached to the frame 11 in a position at which an electrical connection with either the connection unit 41 or 42 can be obtained. Similar connection units may of course be provided on the right side surface of the frame 11, as seen facing the frame 11, and on the bottom side surface.

With such a constitution, selection of the attachment position of the operations unit 2 can be selected depending on a user's hand size and preference, and the operability of the operations unit 2 increases significantly.

The connector engagement unit for engaging the electrical connector 32 of the battery unit 3 may be constituted so that engagement is possible within a prescribed range, further increasing operability.

Figure 12:
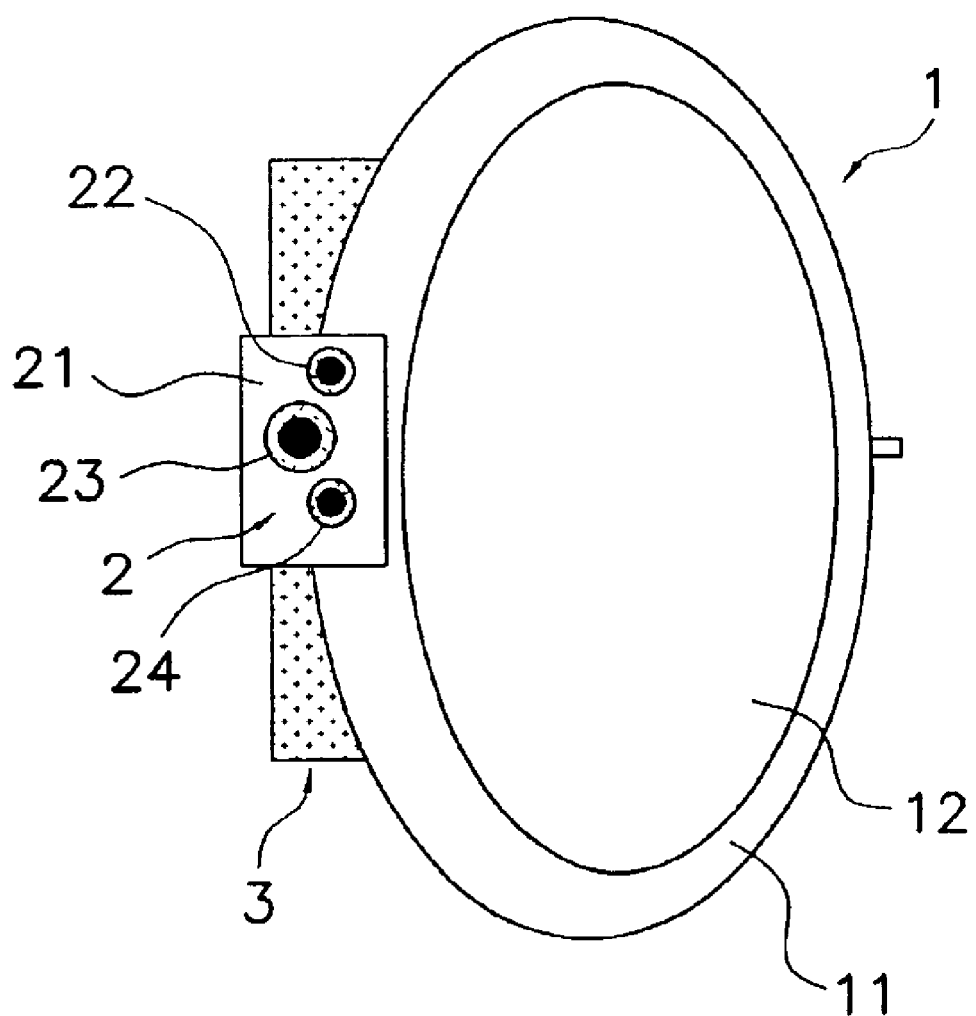
FIG. 12 is a drawing for explaining another embodiment of the present invention.

C: The display panel 12 is not limited to a rectangular shape, and, as shown in FIG. 12, may be an oval shape, triangular shape or other polygonal shape, constituted so that the attachment position of the operations unit 2 can be selected to conform with display direction.

With the present invention, display can be made of a variety of Internet contents in the optimal display direction, and by changing the attachment position of operations instruction means, operability can be enhanced.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A portable information device comprising:

a device body comprising a display means such that selection can be made from a plurality of display directions for display of images and information and the like;

an operational instruction means capable of accepting input of instructions including selection instructions to said display means to select display direction for images, information and the like; and a battery unit that supplies power to said body; said portable information device having a plurality of attachment positions on said device body so that at least one of said operational instruction means and the battery unit can be attached at a position compatible with display direction of images, information and the like on said display means.

2. A portable information device according to claim 1, wherein said operational instruction means comprises a plurality of instruction units, the functions of said operations units differing in accordance with position of attachment on said device body.

3. A portable information device according to claim 1, wherein said device body decides display direction of images, information and the like on the display means in accordance with the position of attachment of said operational instruction means on the device body.

4. A portable information device according to claim 1, wherein said device body comprises an attachment position such that said operational instruction means and the battery unit can be integrally attached.

5. A portable information device according to claim 1, wherein the plurality of attachment positions of said device body are such that at least one of said operational instruction means and the battery unit can be attached within a prescribed range.

6. A portable information device according to claim 1, wherein the plurality of attachment positions of said device body are disposed such that the operational instruction means and the battery unit are positioned in the same direction with regard to said display means.

7. A portable information device according to claim 1, wherein said display means has a rectangular shape having long sides and short sides, and the plurality of attachment positions on said device body are disposed in positions such that at least one of said operational instruction means and the battery unit can be attached to allow the accommodation of the display direction of images, information and the like for which the long sides of the display means are positioned vertically and of the display direction of images, information and the like for which the short sides of the display means are positioned vertically.

8. A portable information device comprising:
   a device body comprising a display means for displaying information;
   a battery unit, disposed in a direction offset from the center of said display means, that supplies power to said device body;
   a grip for supporting said device body in the center of gravity direction in which said battery unit is disposed; and
   an operational instruction means disposed on said grip and capable of accepting input of instructions for said display means.

* * * * *